Figures 1, 2:
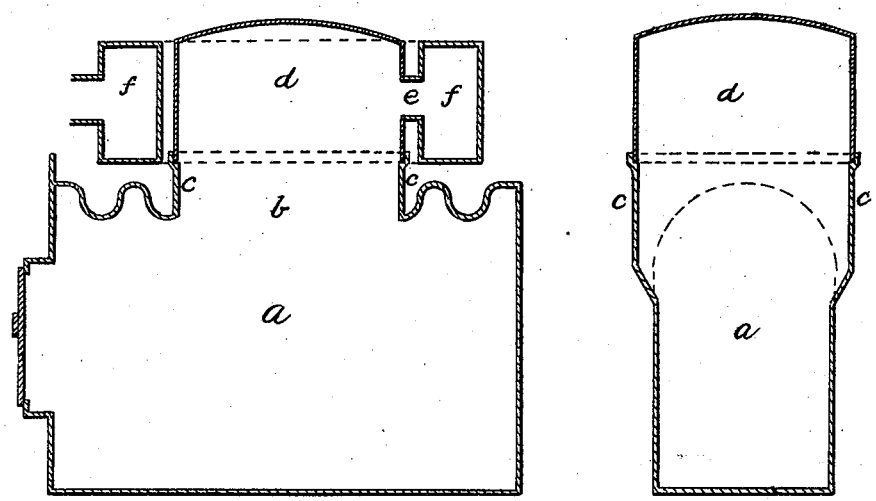

H. A. WOOD.
Wood-Burning Furnace.

No. 207,788.  Patented Sept. 3, 1878.

Witness
John R. Mason
W. H. Simmons M.D.

Inventor
Henry A. Wood
By W. Franklin Seavey, Atty

UNITED STATES PATENT OFFICE.

HENRY A. WOOD, OF BANGOR, MAINE.

IMPROVEMENT IN WOOD-BURNING FURNACES.

Specification forming part of Letters Patent No. 207,788, dated September 3, 1878; application filed January 26, 1878.

*To all whom it may concern:*

Be it known that I, HENRY A. WOOD, of Bangor, in the county of Penobscot and State of Maine, have invented certain new and useful Improvements in Wood-Burning Furnaces; and I do hereby declare that the following is a full, clear, and exact description of the invention, that will enable others skilled in the art to which it appertains to make and use the same, reference being had to the accompanying drawings, forming a part of this specification, in which—

Figure 1 shows a longitudinal vertical section; Fig. 2, a cross-section.

Same letters show like parts.

My invention relates to wood-burning furnaces; and consists in the combination therewith of a central dome, placed directly over the combustion-chamber, and forming a reservoir, into which the products of combustion rise on their passage to the annular radiator surrounding said dome, through which the smoke and heat pass on their way to the chimney.

I will explain my invention by reference to the accompanying drawing.

At $a$ is shown the body of the furnace, preferably constructed of cast corrugated iron, and provided with the usual doors, drafts, &c. At the top of the body $a$, near its middle and directly over the combustion-chamber, is an opening, $b$, surrounded by a flange, $c$, which may be cast with the body of the furnace or otherwise secured thereto. Upon this flange is secured the dome $d$, having an escape-pipe, $e$, for the smoke, which communicates with an annular radiator surrounding the dome. This radiator is shown at $f$.

The whole furnace may be inclosed in a brick or iron casing, as preferred.

The products of combustion from all parts of the combustion-chamber converge and rise into the dome previous to their escape. It thus not only adds to the heating-surface of the furnace, but forms a reservoir, in which, from its position and construction, the gaseous products of combustion are directly exposed to the flame, insuring their more complete combustion.

I do not claim, broadly, the combination of a dome with a furnace, for I am aware that coal-burning furnaces have been constructed with domes heretofore; but, applied to a wood-burning furnace, a dome performs new and important functions, not only increasing the heating-surface, which is its only use in a coal-furnace, but also serving as a reservoir and combustion-chamber for the gases of the burning fuel, collecting and retarding them in such a position with regard to the fire-box that they are exposed to the tongues of flame from the fire and consumed instead of escaping by the flue or into a radiator, through a small opening through which the flame cannot follow; nor do I claim a simple drum placed on the body of a stove or furnace, and connected therewith by a narrow orifice. My invention calls for a dome communicating directly with the fire-box, and open at the bottom across its whole extent, provided with an exit for the smoke at the side near the top; nor do I claim a stove or furnace, either for coal or wood, provided with an upward extension greater or less in diameter than the body of the stove, and operating simply to increase the heating-surface, as I am aware that such device is not new.

What I claim as my invention, and desire to secure by Letters Patent, is—

In a wood-burning furnace, the combination, with the body $a$, of a central dome, $d$, open at the bottom across its whole extent, and having the exit-pipe $e$ of the furnace at its side near the top, said dome being secured to said body by a flange, $c$, and forming a reservoir for the products of combustion on their passage to the annular radiator $f$ surrounding said dome, and communicating through the exit-pipe thereof with the chimney, substantially as and for the purposes set forth.

In testimony that I claim the foregoing I have hereunto set my hand this 23d day of January, 1878.

HENRY A. WOOD.

Witnesses:
JOHN R. MASON,
WM. FRANKLIN SEAVEY.